Figure 1:
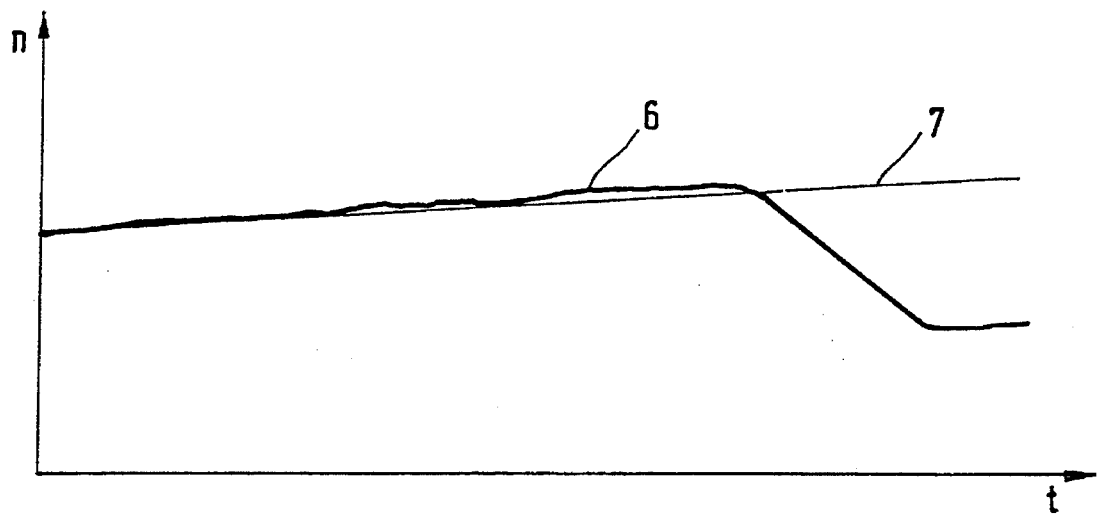

United States Patent [19]
Gruhle et al.

[11] Patent Number: 5,609,068
[45] Date of Patent: Mar. 11, 1997

[54] PROCESS FOR CONTROLLING AND REGULATING THE LOAD TAKE-UP IN AN AUTOMATIC GEARBOX

[75] Inventors: Wolf-Dieter Gruhle, Tettnang; Peter Sigg, Friedrichshafen; Harald Deiss, Ravensburg; Manfred Schwab, Tettnang; Wolfgang Danz, Friedrichshafen, all of Germany

[73] Assignee: ZF Friedrichshafen AB, Friedrichshafen, Germany

[21] Appl. No.: 433,451

[22] PCT Filed: Dec. 1, 1993

[86] PCT No.: PCT/EP93/03357

§ 371 Date: May 9, 1995

§ 102(e) Date: May 9, 1995

[87] PCT Pub. No.: WO94/12814

PCT Pub. Date: Jun. 9, 1994

[30] Foreign Application Priority Data

Dec. 3, 1992 [DE] Germany ............... 42 40 621.8

[51] Int. Cl.⁶ .............. F16H 61/06; F16D 25/10
[52] U.S. Cl. ............... 74/336 R; 192/87.13; 192/87.18; 192/103 F
[58] Field of Search ............... 192/3.58, 87.18, 192/87.14, 87.13, 103 F, 109 F; 74/336 R; 477/143

[56] References Cited

U.S. PATENT DOCUMENTS

| | | | |
|---|---|---|---|
| 4,219,109 | 8/1980 | Ushijima et al. | 192/109 F X |
| 4,942,787 | 7/1990 | Aoki et al. | 192/109 F X |
| 4,984,483 | 1/1991 | Hiramatsu et al. | |
| 5,079,970 | 1/1992 | Butts et al. | |
| 5,234,087 | 8/1993 | Jurgens et al. | 192/87.13 X |
| 5,285,880 | 2/1994 | Minagawa et al. | 192/3.58 |

FOREIGN PATENT DOCUMENTS

| | | |
|---|---|---|
| 0288779 | 11/1988 | European Pat. Off. . |
| 0435378 | 7/1991 | European Pat. Off. . |
| 4114382 | 11/1991 | Germany . |

*Primary Examiner*—Rodney H. Bonck
*Attorney, Agent, or Firm*—Davis and Bujold

[57] ABSTRACT

The proposal is for a process for controlling and regulating the load take-up in an automatic transmission. To this end, in an overlapping gear change, the torque take-up of a first engaging clutch is derived from feedback values. The feedback values control or regulate the operation of a second disengaging clutch.

19 Claims, 3 Drawing Sheets

PROCESS FOR CONTROLLING AND REGULATING THE LOAD TAKE-UP IN AN AUTOMATIC GEARBOX

The invention concerns a process for controlling and regulating the load take-up in an automatic transmission.

In an automatic transmission the load take-up takes place during the gear-changing operation by mechanical or hydraulic means, such as a one-way clutch or shut-off valve. Another embodiment of the load take-up is an overlapping gear change. In such a gear change a first engaging clutch takes up the torque from a second disengaging clutch. In order that the traction is uninterrupted, the range of the pressure build-up of the first clutch and the disengaging operation of the second clutch overlap.

DE-41 14 382 has disclosed a method of clutch shifting in an automatic transmission. Here a first clutch is thrown into gear and a second clutch is released.

The problem on which the invention is based, is to make the operation of the second, disengaging clutch in an overlapping change of gear dependent on the manner in which the first, engaging clutch takes up the load to be shifted.

According to the invention, the problem is solved by the characteristic features of the first claim.

The solution according to the invention constitutes a control process. The control process offers the advantage of combining quickness and simple construction with a great measure of interference security. The control process is based on the fact that the periodic operation and pressure build-up in a first engaging clutch are known, for ex., from testing. The actual operation, the pressure build-up in the first clutch and the pressure drop in a second disengaging clutch follow the controlled standard. In order to know with certainty the load take-up point, the pressure level in the second clutch is lowered until a slight speed difference, such as <10 rpm, appears in it. Due to the pressure build-up in the first clutch, it starts transmitting a torque so that the speed difference diminishes. If said difference drops to zero, the second clutch is disengaged, since the first clutch has completely taken up the load. The load take-up point, that is, the pressure value at which the transmitted torque in the first clutch is greater than in the second clutch, remains constant.

As a result of interference levels, a temporary shifting of the take-up point can occur. Tolerances of mechanical structural parts and the temperature of the pressure medium, for ex., are interference levels. This leads to an increased friction load of the clutch discs. An improvement is obtained by superimposing a regulation on the control process.

In this regulation process, it is assumed that the periodic operation and the pressure build-up in a first clutch are unknown. A second clutch should only open completely when the first clutch can take up the load with certainty. The degree of load take-up of the first clutch is derived from a feedback value. For this purpose, during the quick loading phase of the first clutch, the pressure level in the second clutch is lowered until a constant slip value appears. At what moment and in what manner the first clutch starts transmitting a torque is detected by the change of regulating variables, clutch slippage, or speed difference. The pressure in the second clutch is lowered to the same extent as pressure builds up in the first clutch by comparing a given desired speed difference with the actual speed difference.

Combinations of both processes are advantageous. At lower temperatures of the pressure medium, the regulating process is first used. If the pressure medium has reached a higher temperature range, then a change to the control process is made. A change to the regulating process is always made when, in the control process, the speed difference increases as result of poor loading of the first clutch.

In both processes, a new signal can be generated from the value of the speed difference in the electronic transmission control. When the speed difference is zero or almost zero, said new signal can be used, for example, to change the firing angle in an electronic engine control. A change of the firing angle toward the upper dead point produces a reduction of the engine torque. Compared to the formerly known systems, it is an advantage that the change of the firing angle occurs before the moment when the first clutch starts transmitting a torque. An early reduction of engine torque means that the friction capacity of the clutch has been reduced and torque peaks suppressed. A longer operating life of the friction lining is thereby obtained.

Figure 1A:
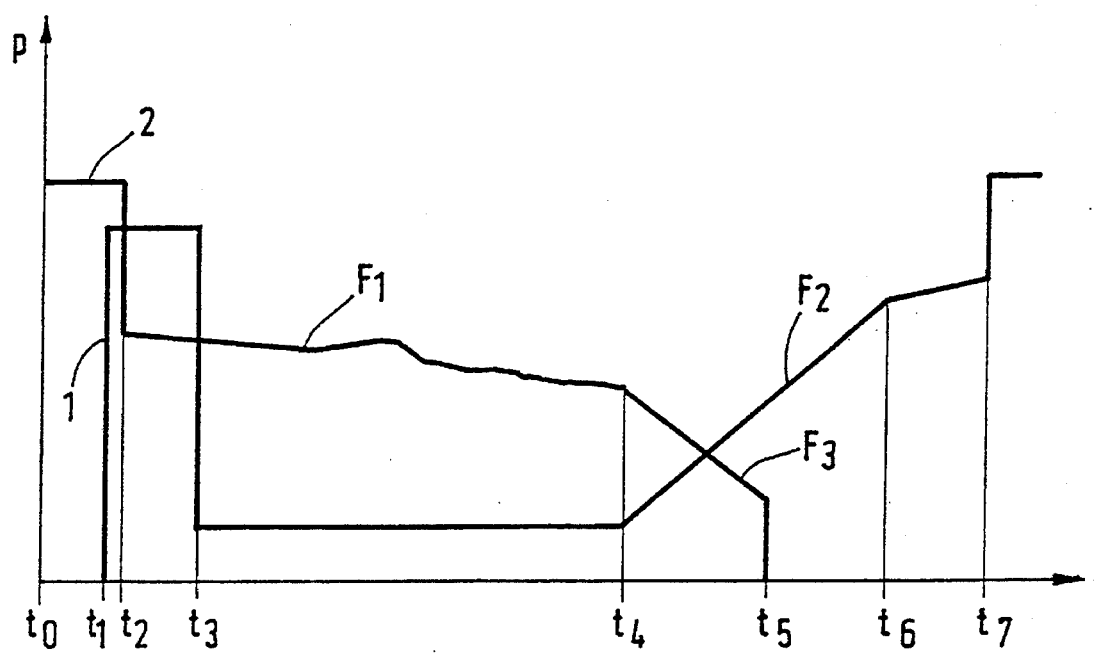
Figure 2:
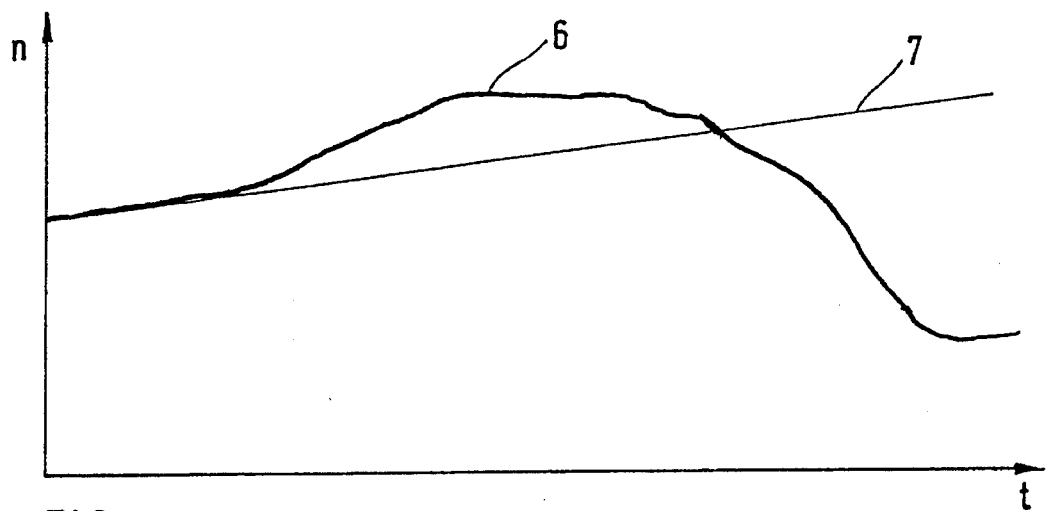
Figure 2A:
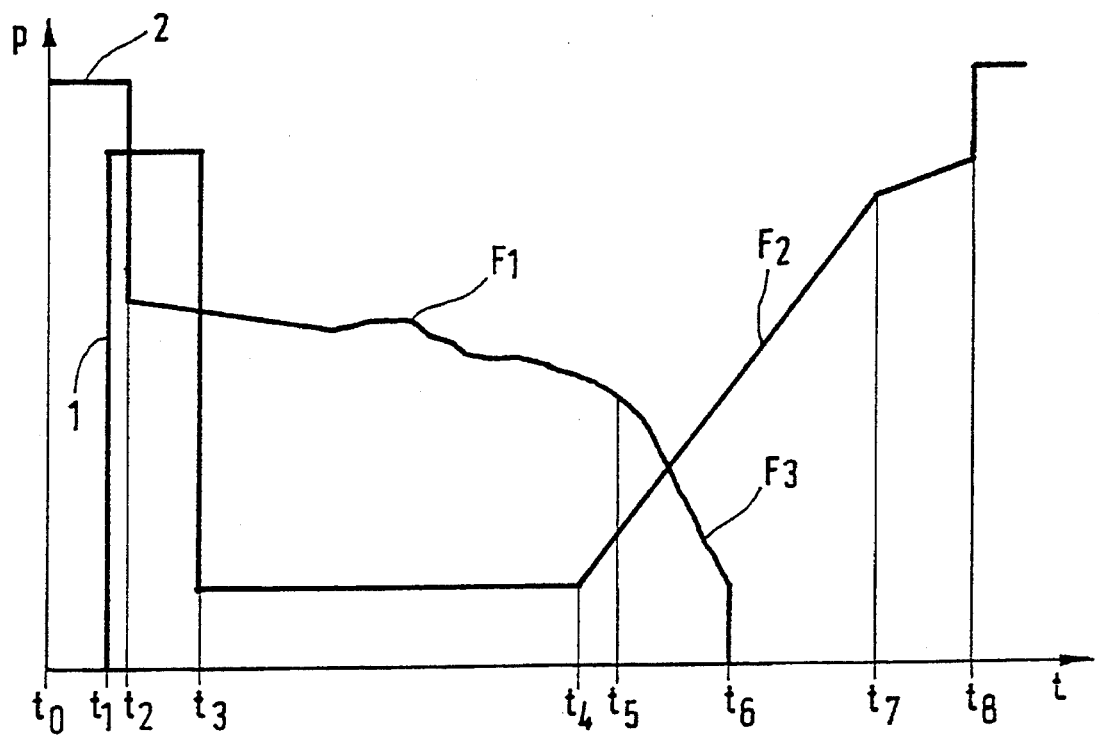
Figure 3:
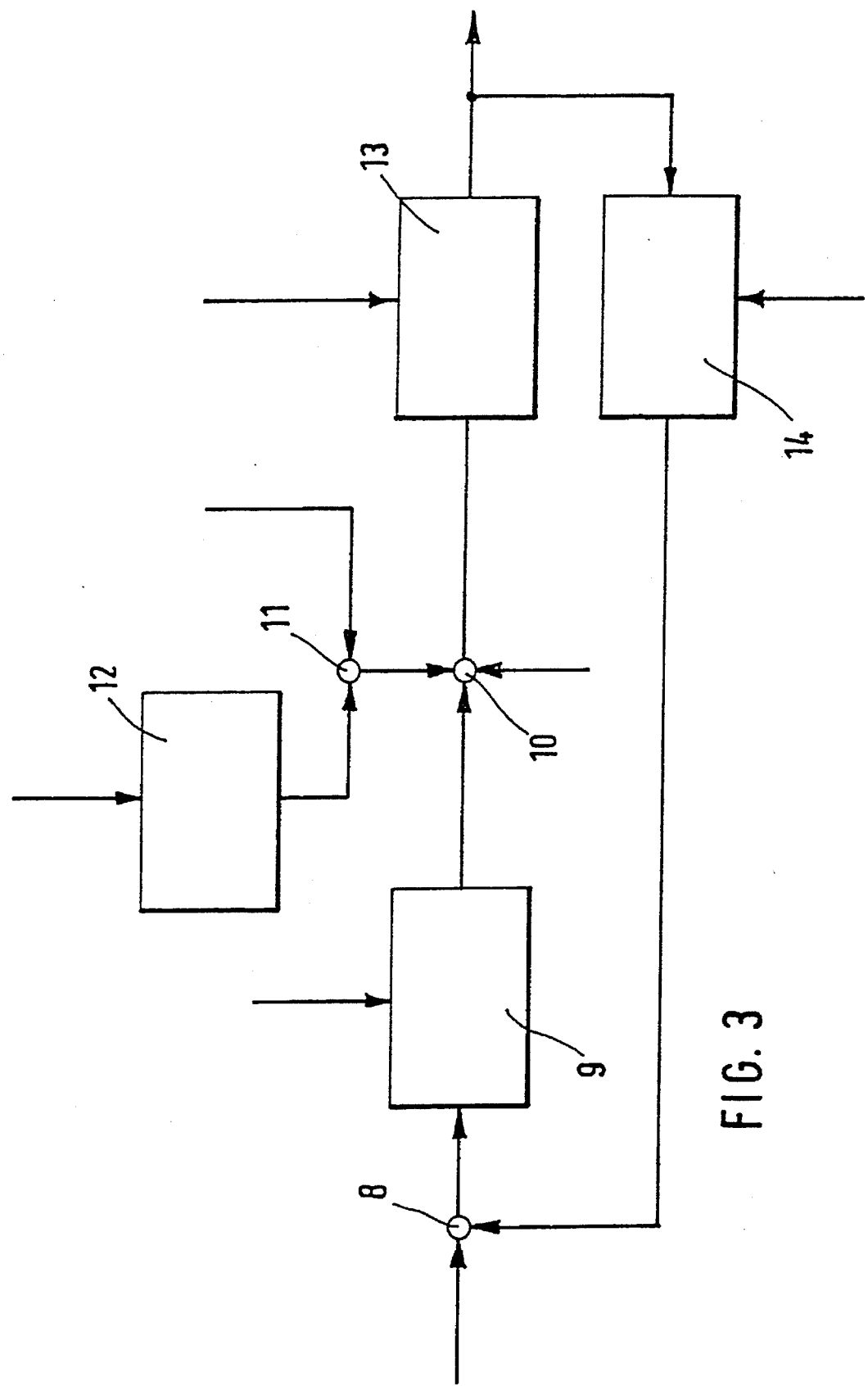

Embodiments of the control and regulation process are shown in the drawings. The drawings show:

FIG. 1 the speed-time diagram of the control process;

FIG. 1A the pressure-time diagram of the control process;

FIG. 2 the speed-time diagram of the regulation process;

FIG. 2A the pressure-time diagram of the regulation process;

FIG. 3 a block diagram of the automatic control system.

The control process is explained with reference to FIGS. 1 and 1A. An upshift is shown. The gear-changing course of an engaging clutch 1 consists of: quick loading phase, load compensation phase, pressure build-up ramp according to a time function F2 and change to maximum pressure. The gear-changing course of a disengaging clutch 2 consists of: change from maximum to holding pressure, control phase with a time function F1, pressure reduction according to a time function F3 and complete disengagement. The switching starts at the moment t0 with the alter command. In the time interval t1 to t3, the clutch 1 is loaded with high pressure, the quick loading pressure. The clutch 1 is preliminarily loaded by the quick loading pressure. The load compensation phase of the clutch 1 starts at the moment t3, after the quick loading phase. In the load compensation phase the clutch 1 is filled with the pressure medium. The load compensation phase terminates at t4. At the moment t4, one clutch-feeding element abuts on the friction elements of the clutch 1. Still no torque has been transmitted.

During the quick loading phase, the pressure of the clutch 2 is lowered at the moment t2. In the time interval from t2 to t4, the pressure course of the second clutch follows a first time function F1. The pressure in the clutch 2 is reduced until a slight speed difference, such as <10 rpm, appears. The speed difference is calculated from the actual transmission input speed 6 minus the product 7 of the old reduction ratio multiplied by the transmission output speed.

The pressure build-up of the clutch 1, according to a second time function F2, and the pressure drop of the clutch 2, according to a third time function F3, begin simultaneously at t4. The amounts of pressure reduction in clutch 2 and of pressure build-up in clutch 1 are equal. At the moment t5, the speed difference drops to almost zero, since the clutch 1 starts transmitting torque.

At t5 the clutch 1 has fully taken up the load, and the hydraulic pressure of the clutch 2 is lowered to zero. The second time function F2 of the clutch 1 terminates at t6, and at t7 the maximum pressure abuts on the clutch.

The regulation process is explained with reference to FIG. 2 and 2A. The shifting course of the clutch 1 consists of: quick loading phase, load compensation phase, pressure build-up ramp according to a time function F2 and change to maximum pressure. The shifting course for the clutch 2 consists of: change from maximum to holding pressure, regulating phase with a time function F1, pressure reduction according to a time function F3 and complete disengagement. The shifting starts at the moment t0 with the alter command. The clutch 1 is charged with high pressure, the quick loading pressure, in the time interval t1 to t3. The clutch 1 is preliminarily loaded by the quick loading pressure. The load compensation phase of the clutch 1 starts at the moment t3, after the quick loading phase. In the load compensation phase the clutch 1 is loaded with the pressure medium. The load compensation phase terminates a t4. At the moment t4, a clutch-feeding element abuts on the friction elements of the clutch 1. Still no torque has been transmitted.

During the quick loading phase, the pressure in the clutch 2 is lowered at the moment t2. This new pressure value is slightly higher than the theoretic holding pressure. Due to the pressure drop, a slight speed difference appears in the clutch 2. The speed difference is calculated from the actual transmission input speed 6 minus the product 7 of the old reduction ratio multiplied by the transmission output speed. At the moment t2, a first time function F1 begins for the clutch 2, the clutch pressure is lowered by the regulation until the speed difference corresponds to a desired value.

The pressure ramp of the clutch 1 starts at the moment t4. The pressure build-up follows a second time function F2. During said second time function F2, the clutch 1 starts transmitting a torque as a result of the pressure level. The speed difference is thereby reduced at moment t5. The regulator unit follows a desired characteristic line for the speed difference and lowers the pressure in the clutch 2 in accordance with a third time function F3. The clutch 1 has fully taken up the load at the moment t6, so that the speed difference is almost zero, and the hydraulic pressure in the clutch 2 is lowered to zero. The second time function F2 of the clutch 1 is terminated at the moment t7, at t8 the maximum pressure abuts on the clutch 1. The shifting operation has ended.

In development of the invention it is proposed that, in the regulation process, the third time function F3 of the clutch 2 be decisively determined by a special function. The special function is activated when the pressure build-up in the clutch 1 occurs too suddenly during the second time function F2, time interval t4 to t7. This is detected when the speed difference has dropped to about 50% of the desired value. The special function prevents the clutch 2 from closing again due to a too slow regulating behavior. It is further suggested that the hydraulic pressure of the clutch 2 be additionally controlled depending on the load. This ensures that, in case of load changes during the shifting, the pressure of the clutch 2 can follow the load change under control and not be produced by great changes of the speed difference and thus of the output error.

Other suggestions are:

the introduction of a desired characteristic line value for the speed difference which constitutes a function of the engine speed;

a temporary limitation of the slip phase of the clutch 2 in order to reduce the load of the friction elements. The slip phase starts at the t2 moment with the lowering of pressure and terminates with the complete disengagement of the clutch 2;

the introduction of another special function. The special function is activated when the clutch 1 starts transmitting a torque during the load compensation phase, t3 to t4. This can be caused by tolerances of structural parts. The pressure in the clutch 2 is reduced during the first time function F1 by the special function.

Both processes can be combined:

depending on temperature:

at low temperatures the loading degree and the torque take-up in the clutch 1 are uncertain as a result of the viscosity of the pressure medium. Therefore, the regulation process is used at first. Upon reaching the operating temperature, the pressure build-up in the clutch 1 follows the controlled standard, and a change is made to the control process;

depending on events:

the control process is used at first. When the speed difference increases as a result of an incomplete loading of the clutch 1, a change is made to the regulation process. After the change, the process begins with the first time function F1 at the moment t2 of FIG. 2 and 2A. The introduction of an adaptive function is suggested as a compliment. This function is always activated upon a change from the control process to the regulation process due to an increase of the speed difference. The adaptive function effects a gradual lengthening of the quick loading time. The preliminary loading of the clutch 1 is thereby improved. The quick loading time is prolonged until the subsequent shifting in the loading of the clutch 1 follows the controlled standard.

FIG. 3 shows a closed control loop consisting of a control unit 9, a first function block 12, the controlled system 13 and a second function block 14.

A command variable and a control variable are compared at the addition point 8. The command variable is a desired standard of the speed difference. The control variable, which is the output quantity of the second function block 14, is the actual speed difference in the clutch 2. An actuating signal results from a comparison of the command variable minus the control variable. Said actuating signal is an input quantity of the control unit 9. Depending on the actuating signal, the control unit 9 adjusts a pressure value, the regulated quantity. In the second addition point 10, the following pressure portions are added: regulated quantity, pressure of a special function and the pressure portion from the third addition point 11. The special function effects an immediate and complete opening of the clutch 2 when the speed difference has dropped to zero or near zero. The third addend of the addition point 10 is the result of the third addition point 11 and adjusts the regulated quantity. The addition point 11 adds a load-dependent pressure portion with a pressure portion, which is the output quantity of the first function block 12. The first function block 12 has the task of adjusting a pressure value in accordance with the actual engine torque. The input quantities of the controlled system 13 are the result of the addition point 10 and another special function. The clutch 2 adjusts the controlled system 13. When the speed difference amounts to substantially 50% of the desired value standard, the special function acts directly upon the controlled system 13 and prevents the clutch 2 from closing again. The input quantities for the second function block 14 are the two output quantities of the controlled system, transmission input and output speeds, and the ratio of the speed level before the start of the switching operation. The actual speed difference is calculated in the second function block 14. The speed difference results from the actual transmission input speed 6 minus the product 7 of the old reduction ratio multiplied by output speed. The output quantity of the second function block 14 is the actual speed difference in the clutch 2 as a regulating variable. The regulating variable is compared at the addition point 8 with the command signal, and the control loop is closed.

The function of the control loop is explained with reference to the pressure-time diagram of FIG. 2A.

At the moment t0, the speed difference is zero. The addition point 8 results in a maximum actuating signal from the comparison of the command signal and the regulating variable. At the moment t2, after an initialization phase of the control unit, not shown, the pressure in the clutch 2 is lowered until a speed difference appears in the clutch 2. If the engine torque and the load are not changed during the shifting operation, the control unit acts upon the controlled system until no actuating signal exists any more, that is, the actual speed difference in the clutch 2 corresponds to a given speed-difference value. This is the time interval t2 to t5 in FIG. 2A. After termination of the loading phase of the clutch 1, the pressure build-up begins according to a second time function F2. When the pressure level is high enough, the clutch 1 starts transmitting a torque. The speed difference thereby diminishes, which leads to an actuating signal and a pressure reduction in the clutch 2. Too sudden a torque take-up of the clutch 1 is not compensated by the control loop, but by a controlled special function. Said special function acts directly upon the clutch 2 and lowers the pressure therein according to a time function F3. The complete disengagement of the clutch 2 at the t6 moment is effected by a controlled special function via the second addition point 10.

| Reference numerals |
| --- |
| 1 engaging clutch |
| 2 disengaging clutch |
| 3 first time function F1 |
| 4 second time function F2 |
| 5 third time function F3 |
| 6 transmission input speed |
| 7 product of old speed level multiplied by transmission output speed |
| 8 first addition point |
| 9 control unit |
| 10 second addition point |
| 11 third addition point |
| 12 first function block |
| 13 controlled system |
| 14 second function block |

We claim:

1. A process for the electronic control and regulation of an automatic transmission having an electronic control mechanism and electronically controlled clutches, of which, at least one first clutch (1) closes upon at least one change of gear while at least one second clutch (2) opens, comprising the steps of:

(a) during a quick loading phase of said first clutch:
      (i) increasing a hydraulic pressure in said first clutch; while
      (ii) lowering a hydraulic pressure of said second clutch (2) until a slip threshold is substantially achieved;

(b) during a load-compensation phase of said first clutch (1), controlling the hydraulic pressure of said second clutch (2) with a control process for lowering the hydraulic pressure of said second clutch (2) according to a first time function (F1), having a desired characteristic line, until a speed difference, calculated from a current input speed (6) minus a product (7) of a previous old reduction ratio multiplied by a current output speed, reaches a predetermined value;

(c) after the load compensation phase:
      (i) raising the hydraulic pressure of said first clutch (1) according to a second time function (F2); while
      (ii) lowering the hydraulic pressure of said second clutch (2) according to a third time function (F3), such that, a slope of said third time function (F3) quantitatively has substantially the same value as a slope of said second time function (F2) of said first clutch (1); and (d) when said speed difference drops to a value substantially equal to zero:
      (i) lowering the pressure of said second clutch (2) to zero; while
      (ii) increasing the pressure of said first clutch to maximum pressure;

(e) wherein, as soon as the speed difference deviates from the desired value by a specific amount, the process further includes the steps of:
      regulating the third time function with a regulation process, for decisively determining a regulated third time function (F3) by superimposing a controlled special function upon the third time function and lowering the hydraulic pressure of said second clutch (2) according to said regulated third time function (F3).

2. A process according to the preamble of claim 1, wherein step (b) further comprises the step of selecting a speed difference of <10 rpm as said predetermined value, so that said second clutch (2) is practically closed during said load-compensation phase of said first clutch (1).

3. A process according to claim 1, further comprising the steps of, when a temperature of said operating medium is below a threshold temperature, regulating the third time function with said regulation process; and when said temperature of said operating medium rises above said threshold temperature, switching back to controlling the third time function with said control process.

4. A process according to claim 1, wherein step (e) further comprises the step of selecting 50% as said specific amount.

5. A process for the electronic control and regulation of an automatic transmission having an electronic control mechanism and electronically controlled clutches, of which, a first clutch engages and a second clutch disengages to effect a gear change, said process comprising the steps of:

(a) during a quick loading phase of a first clutch, decreasing hydraulic pressure of a second clutch until a slip threshold is achieved;

(b) during a load compensation phase of the first clutch, controlling hydraulic pressure of the second clutch with a control process according to a first time function (F1) until a speed difference reaches a predetermined value, the first time function (F1) having a desired characteristic line, and the speed difference being calculated from a current input speed minus a product of a previous reduction ratio multiplied by a current output speed;

(c) after the load compensation phase:
      (i) increasing hydraulic pressure of the first clutch according to a second time function (F2), while
      (ii) decreasing hydraulic pressure of the second clutch according to a third time function (F3), with quantitative slope values of the second and third time functions (F2 and F3) being substantially equal;

(d) when the speed difference substantially equals zero, decreasing the pressure of the second clutch to zero; and (e) when the speed difference deviates from the predetermined value by a deviation amount, regulating the third time function (F3) with a regulation process comprising the steps of:

(i) superimposing a controlled special function upon the third time function (F3), and (ii) decreasing hydraulic pressure of the second clutch according to the regulated third time function.

6. A process according to claim 5, further comprising the step of preliminarily increasing hydraulic pressure of said first clutch to a quick loading pressure during the quick loading phase.

7. A process according to claim 5, further comprising the step of filling said first clutch with a pressure medium during the load compensation phase.

8. A process according to claim 5, further comprising the step of selecting a speed difference of less than about 10 revolutions per minute as the predetermined value.

9. A process according to claim 5, further comprising the steps of:

when an operating medium temperature is below a threshold temperature, regulating the third time function (F3) with the regulation process; and when the operating medium temperature is above the threshold temperature, controlling the third time function (F3) with the control process.

10. A process according to claim 5, further comprising the step of selecting about 50 percent as the deviation amount.

11. A process according to claim 5, further comprising the step of selecting a function of engine speed as the desired characteristic line.

12. A process according to claim 5, further comprising the step of additionally controlling the hydraulic pressure of the second clutch depending on load.

13. A process according to claim 5, further comprising the step of, when the first clutch transmits torque during the load compensation phase, reducing hydraulic pressure in the second clutch by superimposing a load sensitive special function upon the first time function (F1).

14. A process according to claim 5, further comprising the step of temporarily limiting slip of the second clutch during a slip phase.

15. A process according to claim 5, further comprising the step of increasing a duration of a quick loading phase by a desired time increment when the speed difference increases during the third time function (F3).

16. A process according to claim 5, further comprising the step of, below a threshold temperature, regulating the hydraulic pressure of the second clutch (2) and, above said threshold temperature, controlling the hydraulic pressure of the second clutch (2).

17. A process according to claim 5, further comprising the step of controlling the hydraulic pressure of the second clutch (2), independently of temperature, and changing to regulation of the hydraulic pressure of the second clutch (2) only during a switching operation when, during the third time function (F3), the speed difference increases and a change back to the first time function (F1) of the second clutch (2) is made.

18. A process according to claim 5, further comprising the step of increasing the quick loading time of the first clutch (1) by a specific amount every time the speed difference of the second clutch (2) increases during the third time function (F3).

19. A process according to claim 5, further comprising the step of preparing information with an electronic control mechanism when the difference between an input speed (6) minus the product of the previous reduction ratio multiplied by the output speed approaches zero.

* * * * *